April 1, 1941.　　　H. N. WHEELER　　　2,236,658
TIMING AND INDICATING DEVICE
Filed Feb. 23, 1940　　　2 Sheets-Sheet 2
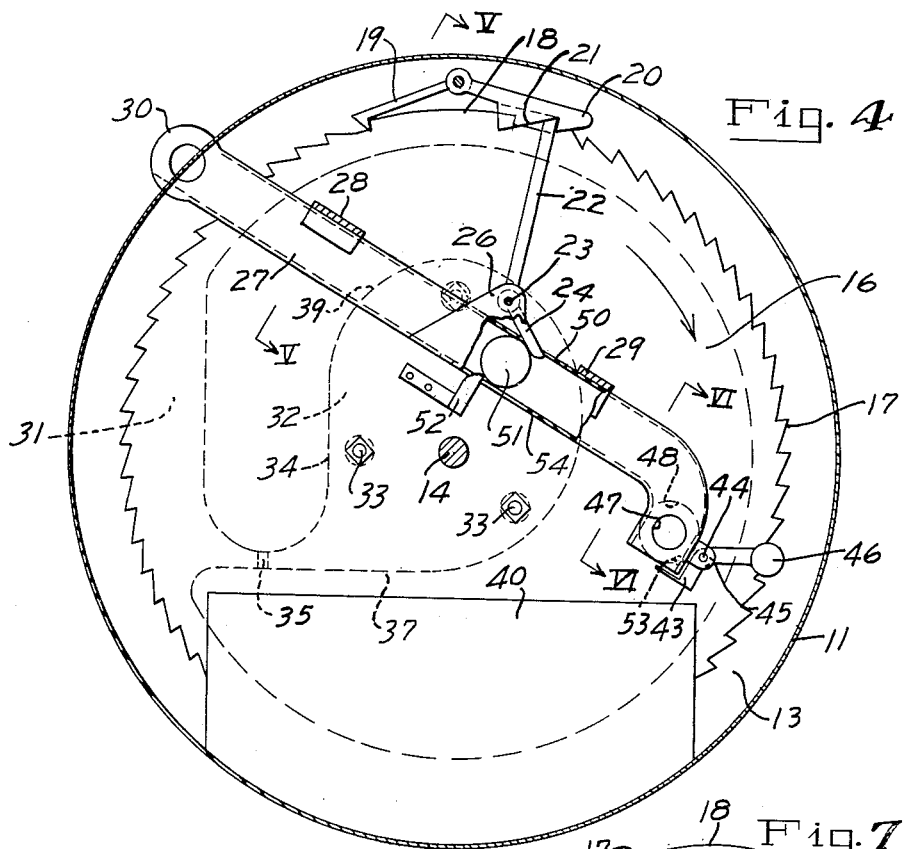
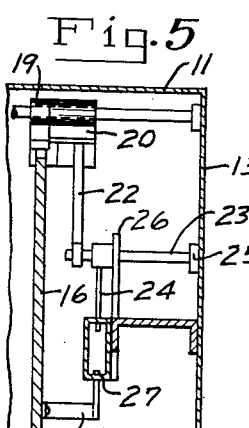
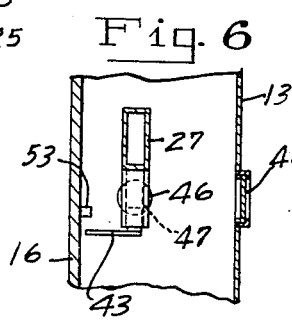
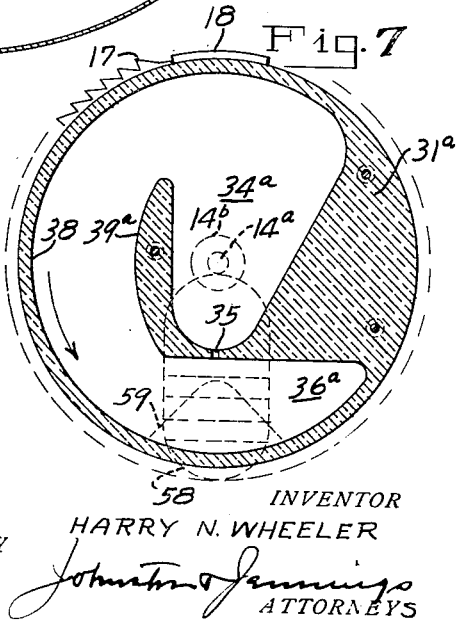
INVENTOR
HARRY N. WHEELER
BY Johnston & Jennings
ATTORNEYS Patented Apr. 1, 1941

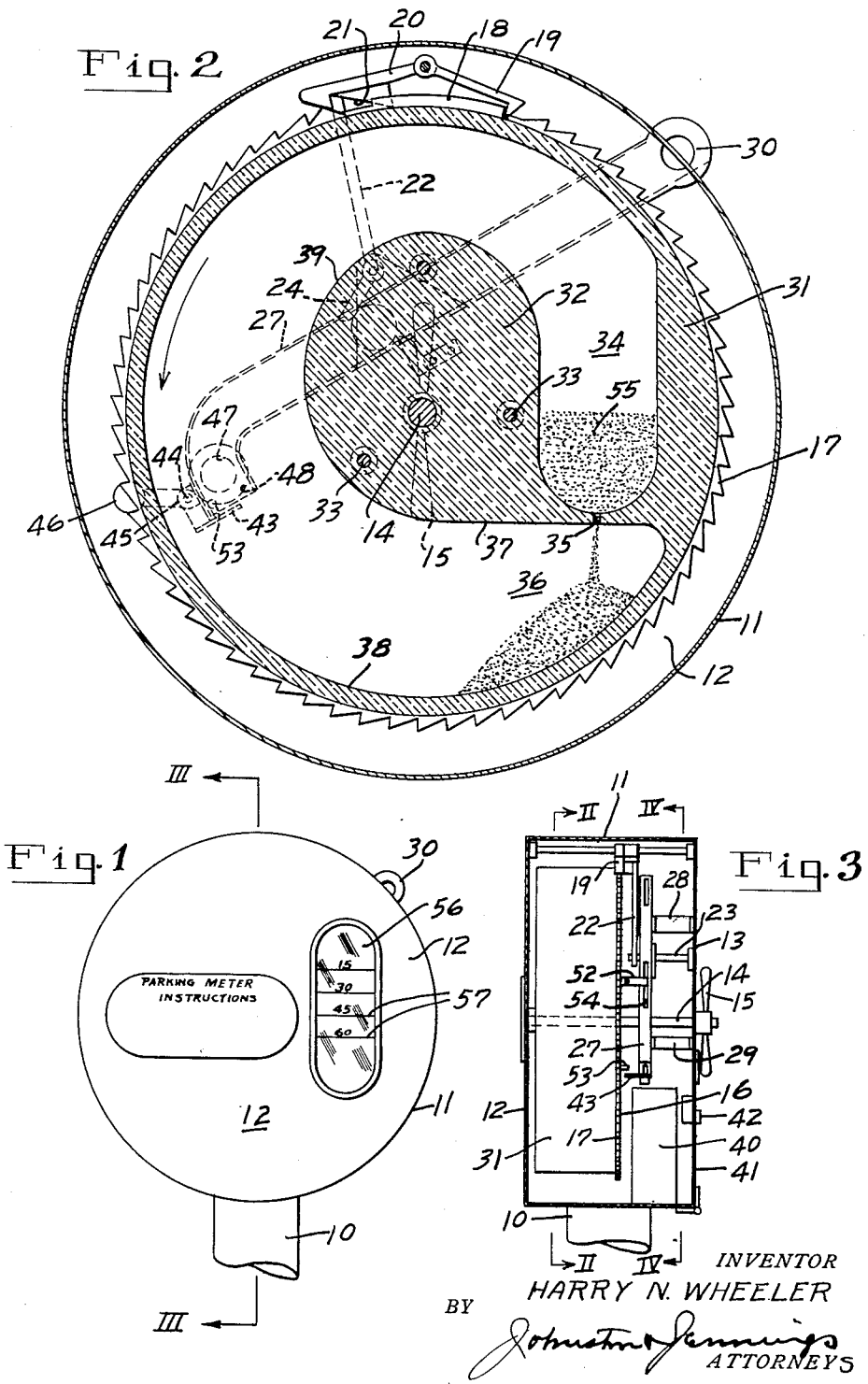

2,236,658

UNITED STATES PATENT OFFICE 2,236,658

TIMING AND INDICATING DEVICE

Harry N. Wheeler, Birmingham, Ala., assignor of one-half to Albert E. Klinkicht, Cincinnati, Ohio Application February 23, 1940, Serial No. 320,456

6 Claims. (Cl. 194—61)

My invention relates to a mechanism for measuring service, or accommodation in terms of elapsed time, and which is of the character to indicate visibly the amount of such elapsed time at all times. Though not confined to such a use, my invention is of peculiar value as applied to parking meters to register the time that a car has occupied a parking space, and to indicate whether such occupancy has exceeded the time limit and is therefore subject to fine or penalty.

The object of my invention is to accomplish the time measuring in the absence of mechanical appliances to that end by the utilization of sand, or any equivalent granular or fluid material, that is arranged to flow away from, or to pass into, a scale bearing compartment in a rotatable container suitably marked to indicate, by reference to the position of such sand, or the like, the elapsed time since the setting of the device.

My invention is essentially characterized by the provision of a sealed container, preferably transparent, which is provided with discharge or receiving compartments, either of which may serve as the measuring chamber, and both of which have communication on the one hand through a restricted flow nozzle and on the other hand by an unrestricted circular bypass through which the sand, or other measuring medium, is free to flow unobstructedly from one side to the other of said measuring nozzle responsize to a rotation of the container.

More particularly my invention contemplates a ratchet mechanism to prevent reverse rotation of the device, and to bring it automatically to rest in measuring position in association with manual means which are preferably arranged so that in order to operate the container through a complete cycle of 360°, the operator will be required to change his hold on the turning handle and thus interpose a moment of delay which facilitates and insures the complete transfer of the sand, or other measuring medium, from one side to the other of the measuring nozzle.

My invention further comprises associating the transparent rotatable timing container with a cabinet having a time measuring scale in relation to a window through which the volume of sand or the like on the measuring side of the nozzle is readily visible, thus enabling the elapsed time to be computed without the use of any moving parts.

My invention further contemplates the arrangement of suitable actuators on the rotatable timing container which act through the inserted coin to release the timing mechanism for rotation, and which also act to retain the last introduced coin in display position opposite a window in the meter cabinet or container.

My invention further comprises the novel details of construction and arrangement of parts which in their preferred embodiments only are illustrated in the accompanying drawings which form a part of this specification, and in which Fig. 1 is a fragmentary view in front elevation of the timing mechanism as applied to a parking meter stand;

Fig. 2 is a cross sectional view enlarged on the line II—II of Fig. 3;

Fig. 3 is a vertical cross section through the cabinet taken on line III—III of Fig. 1 and showing the mechanism therein in end elevation;

Fig. 4 is a cross sectional view taken on the line IV—IV of Fig. 3;

Figs. 5 and 6 are detail cross sectional views taken respectively on the lines V—V and VI—VI of Fig. 4; and Fig. 7 is a view corresponding to Fig. 2 of a modified form of container for the time measuring sand or like medium wherein the elapsed time is indicated by the position of material that has passed through the control nozzle.

Similar reference numerals refer to similar parts throughout the drawings.

In the preferred embodiment shown, and which is obviously adaptable to many different uses, I show any suitable stand 10 having mounted thereon a casing or cabinet comprising an outer cylindrical shell 11 with spaced parallel circular front and back plates 12 and 13 respectively. Centrally through this cabinet I pass a drive shaft 14 journalled in suitable bearings in or on the plates 12 and 13, and with one end projecting beyond the plate 13 to receive a double winged turning handle 15. Fast on this shaft is a metal disk or plate 16 provided with a marginal series of ratchet teeth 17, and a stop shoulder 18. In the top of the cabinet, on a shaft parallel with and above the shaft 14, I mount loosely a pair of reversely disposed pawls 19 and 20, which, by gravity, hang in engagement with the ratchet teeth 17. The pawl 20 is formed on the under side with a cam face 21 disposed to be engaged by the upper end of an actuator arm 22 mounted to rock on a shaft 23 responsive to the actuation of a lower feeler arm 24 which is rigidly connected to 22 so that they operate as a bell crank on said shaft 23. This shaft 23 is rigidly mounted in a bearing 25 on the cabinet wall 13 and in the bracket 26, fast on the coin chute 27, which is rigidly mounted in the cabinet by means of the brackets 28 and 29, with one end 30 exposed for the reception of the desired coin for controlling the timing meter.

A transparent annular hollow body or container 31 is molded to leave a center solid core 32 connecting its front and rear faces and adapted to receive the bolts or rivets 33 by which it is made fast in concentric relation to the ratchet plate 16. The shaft 14 also passes through a suitable aperture in this core 32, which is so shaped as to define on the right, as shown in Fig. 2, a measuring chamber 34 having in the center of its converging bottom a measuring nozzle 35 of suitable shape and design to permit a regulated, restricted outflow of sand, or other measuring medium, from the chamber 34 into a receiving chamber 36. This latter chamber is defined above by the core wall 37, and marginally by the arcuate wall 38 that extends concentric with the center of the rotatable container, from the upper right hand side of chamber 36 to the upper right hand side of chamber 34. The wall 37, which lies horizontally above the receiving chamber 36, merges into the curved inner wall 39 of the arcuate passage that connects the chambers 36 and 34, and which is free of any interruptions so that an arcuate bypass is provided for the free and unrestricted flow of the sand or other medium, from chamber 36 to chamber 34 when the container 31 is given a complete rotation counter-clockwise, as indicated in Fig. 2.

A suitable can or receptacle 40 is placed below the delivery end of the coin chute 27 opposite a hinged door 41 in the cabinet 13, closed by a suitable lock 42. Opposite the delivery end of the chute I mount a pivoted check or stop 43, journalled on a pin 44 in a yoke bearing 45 on the coin chute and having on its upper end a counterweight 46 which normally holds the check in position to arrest a coin opposite a sight hole 47 in the coin chute. Opposite this sight hole 47 is a window 48 in the cabinet wall 13, through which the coin, arrested at the discharge end of the coin chute, can be observed before it is released. The coin chute has a top slot 50 through which the feeler arm 24 passes freely into position to arrest the coin 51 last introduced immediately in front of an actuator lug 52 fast on the ratchet plate 16. A trip pin 53 (Fig. 6) also is mounted on the ratchet plate 16 adjacent to and in position to engage and trip the coin check 43 when the ratchet plate starts to rotate in the direction of the arrow, Fig. 4. It will be observed that the trip pin 53 is farther from the shaft 14 than the pusher lug 52, which, as shown in Fig. 4, moves on an arc through a bottom slot 54 in the coin chute opposite the slot 50, this slot 54 being narrower than the coin 51, so that the latter can not escape therethrough.

When a coin has been inserted in the chute at 30, the operation of the service is as follows:

The coin rolls down the chute 27 until engaged and brought to rest by the feeler 24 in position in front of the pusher lug 52, so that when the operator grasps the handle 15 and commences to turn the shaft 14 clockwise (Fig. 4), the following operation will result. The pawl 20 will allow sufficient play for pusher 52 to engage coin 51 and commence pressing it upwardly to engage and rock feeler arm 24 and with it the cam actuating arm 22 so as to lift the cam 28 clear of the stop shoulder 18 and free the ratchet plate and container for rotation, by which time the coin will have passed down until stopped by 43 in display position opposite the sight hole 47 and window 48. It will be noted that the handle 15 is double winged and that the operator, in order to turn the container a complete revolution, must turn it a partial revolution, allow the container to come to rest, and then grasp the handle again to complete the turning operation. The importance of this stopping is that the granular material will have plenty of time to travel around the bypass, whereas if the container were spun rapidly some of the material might not be delivered into the delivery chamber 34. Before this occurs the feeler 24 will have dropped back into coin arresting position in the coin chute, the pawls 20 and 19 will ride idly over the ratchet teeth until the stop shoulder 18 again engages the pawl 20, which is the position shown in Figs. 2 and 4, whereupon the rotation of the container is checked in its initial position. While the coin 54 is being pushed forward to actuate the feeler arm 24, the more rapidly moving pin 53 will strike and swing the trip 43 clear of the coin chute so that the previously deposited coin is discharged into the cup 40, and the trip 43 will have had time to resume coin-stopping position before the last deposited coin reaches it.

The hollow glass container 31, being rigid with the ratchet wheel on shaft 14, will of course have turned with it, its motion corresponding to the arrows as they appear in Figs. 2 and 4. This motion, as will be best observed in Fig. 2, will cause the arcuate face 38, that lies concentric with shaft 14, to slide freely under the sand in compartment 36 so that the latter will flow freely and unobstructedly along over this face 38 through the bypass formed between it and the curved face 39, until all is restored again to the compartment 34, and thereupon the device is ready for a new operation. In order that the volume of measuring sand can be checked by reference to a visible index to determine the elapsed time, I provide a glass window 56 in cabinet wall 12 having an elapsed time measuring index 57 thereon and disposed opposite the compartment 34 so that by the level of the sand 55 therein observed through the window 56 and through the transparent walls of the container 31, the elapsed time can be read.

In Fig. 7 I have shown a modification of my invention in which an elapsed time index, reverse to that shown at 57, is related to the measuring window 58 provided opposite the pile of sand 59 that has accumulated in the lower measuring compartment 36a, corresponding to 36 in Fig. 2. This compartment 36a is connected by an arcuate bypass between the walls 38 and 39a, with the storage compartment 34a which is shaped to bring the delivery nozzle 35 in position under the center of the container 31a, such center being indicated by the shaft 14a shown in dotted lines, because in this instance the shaft does not pass through the container 31a but has its overhung end attached only by a collar 14b fast to the center of the ratchet plate 16. It is preferable for the shaft not to pass through the sand containing chamber because it would necessitate a packing to prevent access of moisture to the sand. The purpose of bringing the nozzle 35 into a vertical diametric plane through the container 31a is to cause the sand to form a symmetrical pile 59 which should be read by relation to the intersection of its inclined sides with measuring scale on the window 58. The operation is the same as that already described in connection with Figs. 1 to 6, with the exception that the elapsed time is read by reference to the sand which has passed through the nozzle, instead of by reference to the sand awaiting passage through the nozzle, as in Fig. 2.

In all instances where sand is referred to, I mean to include any suitable granular or fluid material fine enough for the slow, but sure and uninterrupted, flow, through the restricted nozzle 35 to measure the required lapse of time since the last coin was introduced in the meter. It is important that there be no obstruction to the free and even flow of the measuring medium along the arcuate wall of the container that supports it in its transfer from the compartment 36 or 36a to the compartment 34 or 34a. By designing such a bypass as shown and avoiding the use of any moving parts in the path of the sand, I provide an exceedingly simple, and yet always reliable, operation of the device, in that it will always cause the transfer of whatever sand has passed the nozzle back into position above the nozzle, with the exception of such minute amount as may fall through the nozzle during the completion of the latter part of the rotation of the sand container. The sand chamber being sealed against access of moisture, will provide reliability of operation notwithstanding the exposure of the instrument to the weather, and the windows make the sand clearly visible for checking the elapsed time and the coin last used visible for checking its validity, it being apparent that the party at the time occupying the parking space will be the one responsible for the coin on display in the meter opposite its window 48.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In an elapsed time measuring and indicating meter, a cabinet having therein a ratchet wheel fast on a horizontal shaft, means accessible from without the cabinet to rotate said ratchet wheel, a pair of reversely disposed pawls coacting with the ratchet wheel teeth to limit its rotation to a given direction, a stop on the ratchet wheel to arrest and lock it by engagement with one of said pawls at the completion of each rotation, a hollow glass annulus fast on the ratchet wheel and containing a sealed-in flow-medium and having internal walls defining a delivery chamber and a receiving chamber for the flow-medium, said delivery chamber being located above the receiving chamber, a diaphragm containing a restricted nozzle interposed between said chambers, and a bypass having an outer continuous arcuate wall over which said flow-medium travels, responsive to the rotation of the container, from the receiving to the delivery chamber, and a window in the cabinet opposite the chamber selected to indicate, by the volume of the flow-medium therein in relation to a time scale, the elapsed time since the meter was last operated.

2. A meter for measuring and indicating elapsed time according to claim 1, in combination with a coin chute juxtaposed to the ratchet wheel, a trip element mounted on said wheel, an actuator designed and arranged to release the pawl restraining the operating rotation of the ratchet wheel and to arrest a coin in said chute in the path of said trip element, and a slot in the chute giving access thereto for the trip element to engage the coin and move said actuator to release the ratchet wheel.

3. In an elapsed time measuring and indicating meter, a cabinet having a ratchet wheel rotatably mounted therein, a container having therein a flow medium, said container being fast on the ratchet wheel and formed with internal delivery and receiving chambers having an interposed diaphragm with a measuring nozzle and having an unrestricted arcuate bypass for the transfer of the flow-medium from the receiving to the delivery chamber responsive to the rotation of the container, said delivery chamber being above the receiving chamber when the device is in time measuring position, means to rotate the chamber in a given direction and bring it to rest in initial position, a coin-controlled means comprising trip elements on the ratchet wheel, an actuator operable by one trip element and the last-received coin to free the ratchet wheel for rotation, and a coin arrester operable by the other trip element to release the prevoiusly deposited coin from the delivery end of the coin chute, means to render the last mentioned coin visible while arrested at the delivery end of the chute, and means to render the flow-medium visible in relation to an elapsed time scale.

4. In an elapsed time measuring and indicating meter, a cabinet, a horizontally disposed shaft rotatably mounted therein, a hollow container of cylindrical external shape rotatable with the shaft, a ratchet wheel on the container with its teeth projecting past the outer circumference thereof, a pair of reversely disposed pawls pivoted to the cabinet and coacting with the ratchet teeth to lock the container against rotation, a flow medium within the container, a rounded core in the container forming superposed delivery and receiving chambers for the flow medium and a bypass connecting the chambers, a wall separating the chambers, there being a restricted opening in said wall to permit the flow medium to pass from the delivery to the receiving chamber when the container is in time measuring position, a downwardly sloping coin slot, a pivoted feeler projecting into the coin slot and adapted to arrest a coin in its passage down the slot, an extension on the feeler member adapted to raise one of said pawls and release the container for rotation in a given direction when the feeler is actuated, a pusher lug fast on the container adapted to engage the coin and actuate the feeler upon rotation of the container, and manually operable means for rotating the container.

5. A meter according to claim 4, in which the pawl actuated by the extension of said feeler is provided with a cam surface against which the feeler extension moves to disengage the pawl from the ratchet teeth.

6. A meter according to claim 4, in which the lower end of the coin chute is provided with a pivoted coin stop for holding a previously deposited coin in the coin chute, there being openings in the chute and the cabinet to render said coin visible while so held, and a pin carried by the container and adapted upon rotation thereof to strike the stop and release the coin.

HARRY N. WHEELER.